Patented Oct. 10, 1939

2,176,032

UNITED STATES PATENT OFFICE 2,176,032

BEVERAGE

Sidney Musher, New York, N. Y., assignor to Musher Foundation Incorporated, New York, N. Y., a corporation of New York No Drawing. Application March 1, 1934, Serial No. 713,605
Renewed May 5, 1938

9 Claims. (Cl. 99—30)

This invention relates to beverages, and particularly alcoholic beverages, as well as alcoholic extracts utilized in the flavoring of foodstuffs, as well as food products containing alcoholic beverages or alcoholic extracts.

Beverages of various kinds, and particularly of the spirituous alcoholic types, including whiskies, brandies, cordials, wines, etc. are largely classified by the flavor and aroma. Consequently flavor in these products, just as flavor in other foodstuffs, is of a most outstanding importance. Throughout the Mediterranean section of Europe, and in fact in all places of the world, wine tasters and wine blenders are at a premium for their knowledge of the characteristic flavors of different wines. Their knowledge is particularly important in view of the widespread blending that is carried out in this field to modify the properties and characteristics, particularly as to flavor and aroma of such beverages. Blending may be resorted to for a number of reasons. For example, an aged wine flavor as produced in one wine that has been aged for many years may be incorporated into a freshly made wine, in order to produce in the latter, at least in part, characteristics of the aged flavor and aroma of the former.

Blending is also utilized to temper or moderate the sharp and acrid flavor, taste or aroma of newly prepared alcoholic beverages. Freshly made alcoholic beverages are characterized by rather sharp and acrid taste, and such undesired characteristics can be eliminated only by ageing for many years to mellow such products, and to produce the finer milder flavor characteristics. Such mellowing or ageing involves long delay and considerable expense, and it was not uncommon to bottle and store these products for years in order that the desired mellowing should be obtained. But in this case also blending has been utilized, as for example, the blending of a 20% of a twenty year old beverage with 80% of a freshly made beverage to some extent, at least, to mellow down the acridity or harshness of the freshly made product.

Further in the prior art, certain of the aromatic seeds or seeds which yield aromatic odors and flavors have been utilized to flavor alcoholic beverages, as for example in the production of kümmel, anise seed has commonly been used. But in such cases, the seeds employed are utilized because of the aromatic pungent odor, aroma or flavor which they impart.

Among the objects of the present invention there is included the production of new and characteristic flavors in alcoholic beverages.

Another object of the present invention resides in the production of new and distinctive flavors in foodstuffs in which alcoholic beverages or extracts are used to any substantial extent.

A still further object of the present invention resides in the utilization of relatively cheap and available materials for flavoring alcoholic beverages without requiring blending with aged liquors, or the addition of relatively expensive ingredients.

A still further object includes the mellowing of freshly made alcoholic beverages by relatively rapid treatments.

A still further object includes modification of the flavors of wines and cordials, including such products as benedictine, chartreuse, etc.

Still further objects and advantages will appear from the more detailed description set forth below, it being understood, however, that such detailed description is given by way of illustration and explanation only, and not by way of limitation, since various changes therein may be made by those skilled in the art without departing from the scope and spirit of the present invention.

In accordance with the present invention it has been found that when crushed sesame seeds are infused with freshly made beverages of the alcoholic type, there is imparted to such beverages a nuttiness and flavor characteristics yielding to such beverages, characteristics that heretofore have been associated only with aged beverages. The term "bland" is hereinafter utilized to cover such sesame seed as may be utilized in accordance with this invention, to distinguish from the aromatic and pungent types of materials like anise seed, etc. of the prior art which rely on their characteristic pungent, aromatic flavor or aroma, whereas in accordance with the present invention relatively bland materials are employed.

The invention will be particularly illustrated with reference to the use of sesame seed, which has been found to exhibit the necessary characteristics in a most unusual manner, particularly with respect to nuttiness, sweetness and aged characteristics that are obtained in rather a unique way by the use of such sesame seed.

The sesame seed is preferably employed in blanched and crushed condition, desirably unroasted. 5% of such blanched, crushed sesame seed may, for example, be added to freshly made sherry wine or brandy, and the infusion permitted to take place at room temperature for approximately one-half hour, after which the solids may be filtered from the liquors. The resulting products exhibit a sweetness and nuttiness comparable with such wines or brandies that otherwise have been aged for as much as ten years.

It is not necessary to limit the operation to room temperature, but ordinarily excessively high temperatures are avoided. Elevated temperatures may, however, be employed, and the time of treatment is thereby diminished. For example, 10% crushed, blanched sesame seed may be incorparated with 90% of freshly made brandy, and the mixture infused at 90° F. for approximately 15 minutes, followed by filtration of the solids. Improvement in flavor, aroma and taste is thus secured in a manner analogous to that set forth immediately above.

Spirituous liquors, such as gin, which are ordinarily not aged at all, may similarly be treated with blanched, crushed sesame seed, to produce a unique product of desirable flavor, etc.

In all cases, the flavor of the blanched, crushed sesame seed when added to these beverages changes the characteristics of the beverages and imparts thereto a sweetness and nuttiness derived from the crushed sesame seed, yielding a product that is quite distinct from what might be expected as an aggregation of the two substances.

The proportion of the crushed sesame seed that is employed may be varied within relatively wide limits, depending entirely upon the characteristic that it is desired to impart to the finished product.

In utilizing this invention, it is not necessary to deal with the whole crushed seed alone. For example, it has been found that if the crushed sesame seed is first treated to express its oil in the usual manner by means of hydraulic presses or expellers, the resultant press cake may be infused with the liquors, and the resulting product is again characterized to a substantial degree by the flavors and ageing characteristics that are obtained from the use of the whole seed.

Consequently the invention is not limited to the use of sesame seeds alone, but includes any extracts of such crushed seeds, as for example, the meal, after expression of the oil, or even the virgin oil itself which has been infused with the finely ground seed.

Usually where the whole crushed sesame seed is used with its full oil content, the resulting infused alcoholic beverage may appear cloudy, but such cloudiness can be removed in the usual way at the same time that the solid meal particles are removed by the usual means for the separation of such material.

Usually, however, where a seed or press cake is employed for the infusion, from which seed or press cake most of the oil had previously been expressed, or in those cases where the alcoholic beverage has a sufficiently high alcoholic content to dissolve thoroughly the entire fat or oil content of the crushed seed, there will be no cloudiness, and actually the presence of the fat or oil will increase the body of the liquor, and the presence of such added oil or fat content not interfering with the clarity of the liquor, is a desirable ingredient, because of its fatty nature.

While it has been particularly pointed out above that direct infusion of the alcoholic beverage with the blanched seed is particularly desirable, it is also possible to use a grain alcohol, for example, to treat the blanched seed, and to produce an alcohol concentrate which may be employed as a base for addition to the beverages in order to impart the characteristics of age and mellowness to them. And such alcohol concentrates may be produced either from the whole crushed seeds, or from such press cakes as are indicated above that are left after the oil has first been expressed in the usual manner.

It may be noted that while in the prior art after expression of oil from vegetable oil seeds by hydraulic presses or expellers, solvent extraction means by the use of volatile solvents, such as hydrocarbons, carbon tetrachloride, etc. have been employed to remove the remaining oil in the seed cake, in such cases the volatile solvents have been eliminated to recover the oil extracted from the seed, and are not used as edible alcoholic solvents for beverage purposes, or in connection with the production of food products.

Under the present invention, the alcoholic vehicle, whether an alcoholic beverage or alcohol itself, is employed as an edible solvent to extract those flavoring and ageing substances that have been found to be highly desirable in ageing of the stated liquors at the same time changing their characteristics and improving the finished products to an unusual degree.

The alcoholic beverages or alcohol extracts obtained in accordance with the present invention may be produced in varying concentrations as desired, and may be used for the flavoring of foodstuffs of various kinds and types, imparting thereto the distinctive flavor characteristics referred to. Such beverages or extracts may be used for example in connection with chocolates or syrups, or other kinds of foods and food products.

While the utilization of this invention has been illustrated above particularly in connection with whiskies and other distilled liquors and wines, etc., it is also applicable in connection with beer and other similar malt beverages, including ales, stout, etc.

Furthermore, while the invention has been particularly illustrated in connection with such products by the inclusion of the seed extracts in the beverage or liquor after the latter has been prepared, these seed extracts may be added or included in the beverage or liquor at an intermediate stage of manufacture and carried through the operations necessary to a completion of the beverage or liquor. It is not necessary that the seed extract be included in the liquor or beverage only after the latter has been completely prepared therefor.

These seed extracts have been found to exert a specific action against oxidation in connection with a number of food products or other materials for human consumption. The protection of such materials against oxidation is rather a specific action that is particularly pronounced in connection with sesame-derived products. Protection against oxidation is also an important feature in connection with many of these beverages and liquors as described herein, since the inclusion of such extracts, particularly those of the sesame seed, in such materials as wines, etc. for example, tends to protect those beverages against oxidation with the production of acidity and souring. The use then of these seed and related extracts in the protection of such beverages and liquors against oxidation and undesired fermentation reaction is an important characteristic of the present invention.

Having thus set forth my invention, I claim:

1. A spirituous alcoholic beverage carrying a sesame seed extract.

2. The method of treating spirituous alcoholic beverages which comprises admixing 10% of crushed sesame seed and 90% of freshly made brandy, infusing the mixture at 90° F. for fifteen minutes, and filtering off the solids.

3. An alcoholic liquor carrying a sesame seed extract.

4. The method of treating spirituous alcoholic beverages which comprises admixing sesame seed with brandy, infusing the mixture at 90° F. and filtering off the solids.

5. The method of treating spirituous alcoholic beverages which comprises admixing an alcoholic liquor with sesame seed, infusing the mixture at a moderate temperature, and filtering off the solids.

6. Wine carrying a sesame seed extract.

7. A method of treating wine which comprises admixing sesame seed in the wine at a moderate temperature and then filtering to remove the undissolved sesame seed solids.

8. Whiskey carrying a sesame seed extract.

9. A method of treating whiskey which comprises admixing sesame seed in the whiskey at a moderate temperature and then filtering to remove the undissolved sesame seed solids.

SIDNEY MUSHER.